Aug. 18, 1931.  R. A. DELP  1,819,545
AUTOMOBILE TOP
Filed June 9, 1928
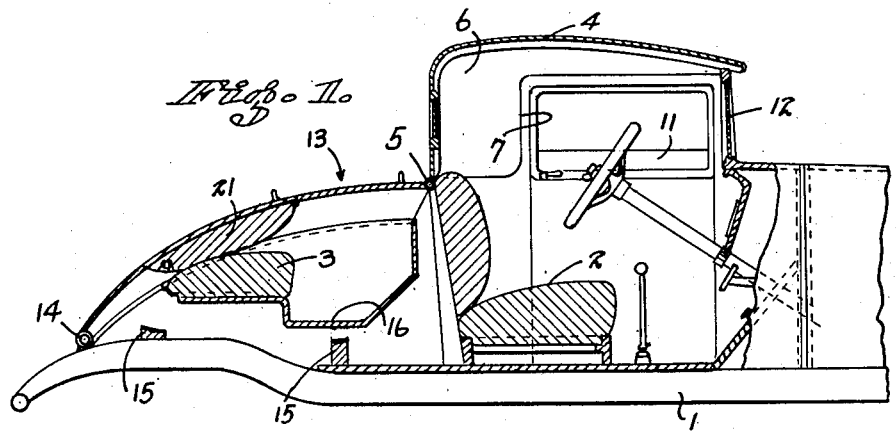
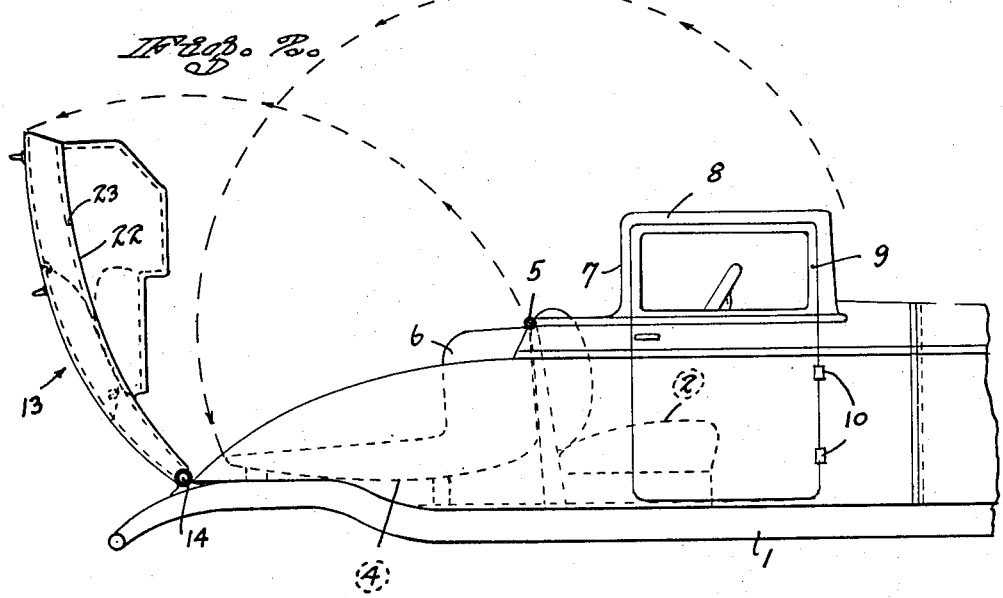
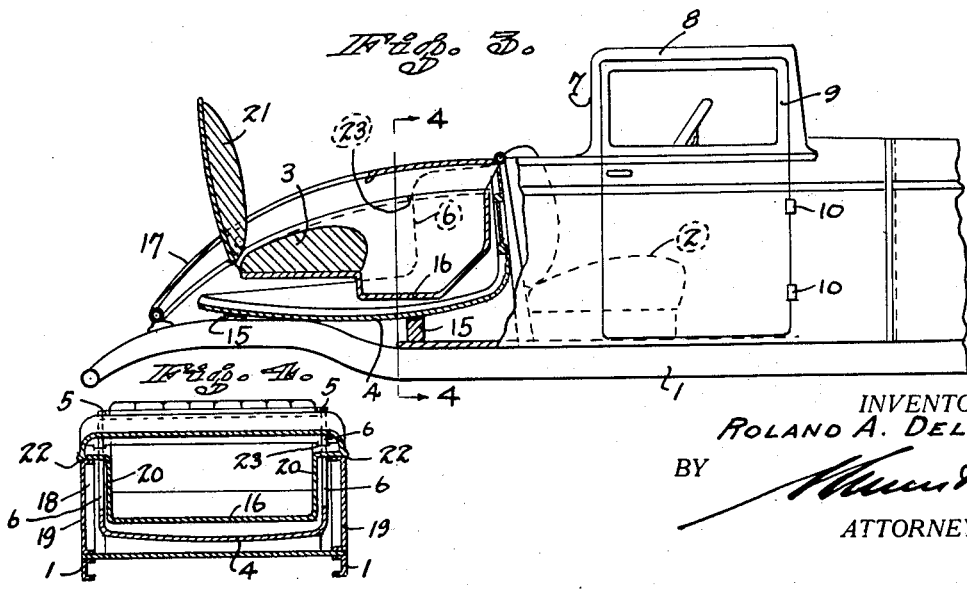
INVENTOR.
ROLAND A. DELP
BY
ATTORNEYS.

Patented Aug. 18, 1931

1,819,545

UNITED STATES PATENT OFFICE

ROLAND A. DELP, OF OAKLAND, CALIFORNIA

AUTOMOBILE TOP

Application filed June 9, 1928. Serial No. 284,164.

My invention relates to improvements in automobile tops, and it consists in the combinations, constructions, and arrangements hereinafter described and claimed.

An object of my invention is to provide an automobile top which is designed especially for convertible coupés. The top when up provides a water-tight covering which closely resembles in all respects a coupé top, but when in inoperative position is entirely hidden from view, and the automobile is given the appearance of a roadster having novelly-designed doors.

A further object of my invention is to provide an automobile top which may be swung into a position underlying the rumble seat, and which will not interfere with the use of this seat. The top may be swung into operative or inoperative position by one person, and it is of the rigid type so that a constant swinging of the top into either of its two positions will not mar the covering, as is usually the case with folding tops made of flexible material.

Other objects and advantages will appear as the specification proceeds, and the novel features will be particularly pointed out in what I hereinafter claim.

My invention is illustrated in the accompanying drawings forming a part of this application, in which Figure 1 is a longitudinal section through an automobile showing my improved top applied;

Figure 2 is a side elevation of Figure 1 showing the top in inoperative position and the rumble seat structure swung so as to permit the movement of the top;

Figure 3 shows a sectional view of the top in closed position and the rumble seat in operative position; and Figure 4 is a section along the line 4—4 of Figure 3.

In carrying out my invention, I make use of an automobile chassis 1 having the usual driver's seat 2 and rumble seat 3. The automobile is of the convertible coupé type, and to this end I provide a rigid top 4 that is hinged at 5 so that the top may be swung from the position shown in Figure 1 into the dotted-line position shown in Figure 2.

The top has its sides 6 cut away as at 7 for receiving the upper part of a door frame 8. This part forms an integral portion of the body, and encloses the top of a door 9. The door is hinged at 10 and has a glass window 11 that may be moved up or down by the usual mechanism not shown. When the top is in inoperative position, the windshield 12 and the windows 11 protect the occupants from the air. The windows may be lowered if it is desired to make the automobile closely resemble a roadster.

The rumble seat 3 is carried by a section 13 of the automobile that is hinged at 14, which permits it to be swung into the position shown in Figure 2 when the top 4 is swung into inoperative position. The top rests upon the supports 15 (see Figure 1) and underlies the floor 16 of the rumble seat (see Figure 3). The floor 16 forms an integral part with the cover 17 of the section 13, and acts as a foot rest. At the same time, the floor prevents the feet of the occupants in the rumble seat from resting upon the top 4.

Reference to Figure 4 shows how the top 4 underlies the floor 16, while the sides 6 of the top are disposed in the spaces 18 formed by the side walls 19 of the body and the side walls 20 of the rumble seat foot compartment. The seat 3 is carried by a raised portion of the floor 16 (see Figure 1) and the back 21 of the rumble seat is swingable from closed position into open position as shown in Figure 3. It should be noted that the section 13 has shoulders 22 (see Figure 2) that rest upon the upper edges of the side walls 19. These shoulders have slots 23 cut therein, as also shown in Figure 2, for receiving a portion of the side 6 (see Figure 3).

When the top is in closed position, it will form a water-tight compartment with the door frame 8. Whether strips may be disposed around the door frame where they will cooperate with the sides of the top for providing water-tight seals.

Although I have shown and described one embodiment of my invention, it is to be understood that the same is susceptible of various changes, and I reserve the right to employ such changes as may come within the scope of the invention as claimed.

I claim:

1. An automobile having a rigid top hinged to the body of the car at the back of the top, the back of the car having a compartment large enough to receive the rigid top, a cover for the compartment, a rumble seat carried by the cover and a floor carried by the cover for supporting the feet of the occupants in the rumble seat above the concealed top.

2. An automobile comprising a top, a compartment for receiving the top, a rumble seat carrying section disposed in the compartment and being movable into a position for allowing the top to be moved therebeneath, said section having a floor board overlying the top for protecting the latter when in inoperative position.

3. An automobile having a top hinged at its back, a compartment for receiving the top, a rumble seat carrying section swingable into a position for allowing the top to be swung into the compartment beneath said section, and a floor board adapted to overlie the top when the latter is in inoperative position.

4. An automobile having a top, a rear compartment for receiving the top, a cover for the compartment, a rumble seat disposed in the rear compartment and having a floor board, said floor board extending over the top when the latter is in inoperative position, and sides secured to the floor board and the compartment cover for forming a leg-receiving compartment.

5. An automobile having a hinged top and a compartment large enough to receive the top, a cover for the compartment, a rumble seat carried thereby, and a floor carried by the cover and extending over the top when the latter is in inoperative position for supporting the feet of the occupants in the rumble seat above the concealed top.

ROLAND A. DELP.